(No Model.) 2 Sheets—Sheet 1.

C. C. PECK.
EMERGENCY CAR BRAKE AND FENDER.

No. 564,533. Patented July 21, 1896.

Witnesses:
Walter H. Coffin.
Frank N. McKenney

Inventor
Charles C. Peck
By William H. Chapman
Attorney (No Model.) 2 Sheets—Sheet 2.
C. C. PECK.
EMERGENCY CAR BRAKE AND FENDER.

No. 564,533. Patented July 21, 1896.

Witnesses:
Walter H. Coffin.
Frank W. McHenry.

Inventor
Charles C. Peck
By William H. Chapman
Attorney

UNITED STATES PATENT OFFICE.

CHARLES C. PECK, OF MIDDLEBURY, VERMONT.

EMERGENCY CAR BRAKE AND FENDER.

SPECIFICATION forming part of Letters Patent No. 564,533, dated July 21, 1896.

Application filed September 17, 1895. Serial No. 562,763. (No model.)

*To all whom it may concern:*

Be it known that I, CHARLES C. PECK, a citizen of the United States, residing at Middlebury, in the county of Addison and State of Vermont, have invented a new and useful Emergency Car Brake and Fender, of which the following is a specification.

My invention relates to cars that are operated on street-railways, and has for its objects, first, to provide a fender that is yielding and will not injure a person whom it may strike, and, second, to provide a mechanism for stopping the car very quickly before the car-wheels shall have reached the person who is struck, and, third, to so connect the fender with the stopping mechanism that a small force against the fender shall act to bring the stopping mechanism into action. I attain these objects by the mechanism illustrated in the accompanying drawings, in which—

Figure 1:
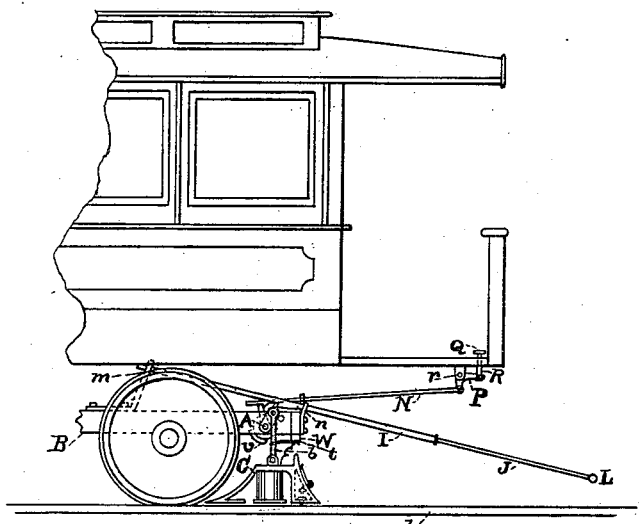
Figure 2:
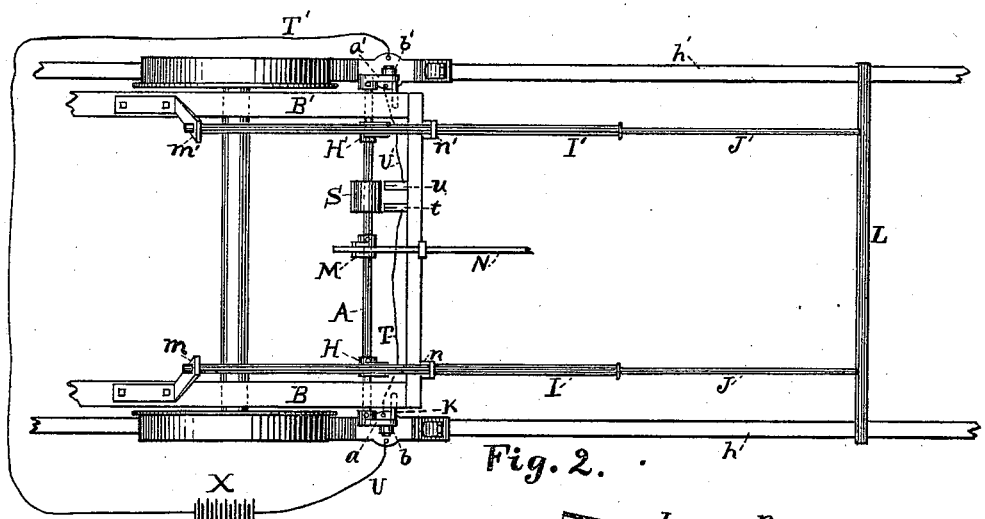
Figures 5, 6:
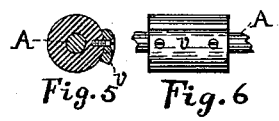
Figure 4:
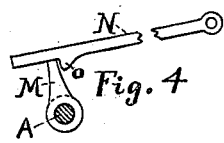
Figure 3:
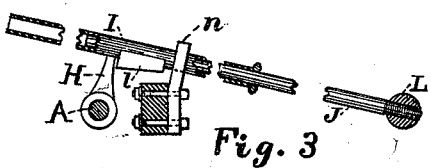
Figure 7:
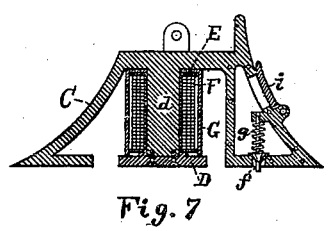
Figure 8:
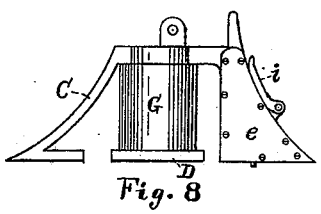
Figure 9:
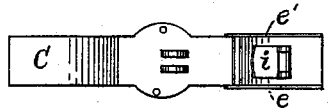
Figure 10:
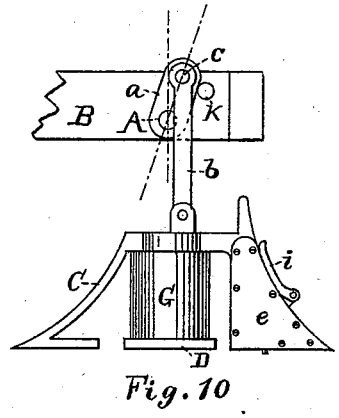

Figure 1 is a side elevation of the forward end of a street-railway car with the brake and fender in position. Fig. 2 is a plan view of the same with the car-body removed and is drawn to a larger scale than Fig. 1. Fig. 3 is a detail view, partly in section, of a portion of the fender and of the brake-tripping device and is drawn to a still larger scale than Fig. 2. Fig. 4 is a detail view of the device for tripping the brake by foot and is drawn to the same scale as Fig. 3. Figs. 5 and 6 are respectively a section and a plan of the electric-circuit-closing device or switch shown at S in Fig. 2. Figs. 7, 8, and 9 are respectively a vertical section, a side elevation, and a plan of the brake-shoe shown in Fig. 1 and on a much larger scale than Fig. 1. Fig. 10 is a side view of one of the brake-shoes, together with the link and lever-arm by which it is suspended from the truck-frame.

Similar letters refer to similar parts throughout the several views.

A is a shaft extending across the truck-frame B B', in which it is journaled so as to turn freely. $a \, a'$ are two lever-arms that are rigidly secured to the shaft A, one at each end, and the two lever-arms are set parallel to each other radially and in their normal position rest against a stop-pin K, secured to the truck-frame B B'.

$b \, b'$ are links whose upper ends turn freely on the pins $c \, c'$, respectively, driven tightly into the upper ends of the lever-arms $a$ and $a'$. The links $b$ and $b'$ are pivoted at their lower ends to the brake-shoes, which they serve to support normally a short distance above the rails $h \, h'$.

Each brake-shoe has an outside frame C of iron or steel with a vertical projection at $d$, forming the core of an electromagnet, and has a closed space at the forward end, the sides of which are formed by the flat pieces of sheet metal $e \, e'$. This inclosed space in the brake-shoe is used to hold sand and will be hereinafter referred to as the "sand-box." Into the sand-box there are two openings, one at the bottom and one at the forward end. The opening at the bottom is kept normally closed by the pop-valve $f$, pressed by the spring $g$. The stem of the valve $f$ extends a little below the lower surface of the brake-shoe, as shown in the drawings. The other opening into the sand-box is normally closed by the hinged cover $i$ and is used to put sand into the box. The rear end of the brake-shoe is curved to conform to the car-wheel, as shown in the drawings. At the lower end of the projection $d$ is rigidly secured a pole-plate D, whose lower surface is flat and in the same plane with the lower surface of the frame C of the brake-shoe, which is also a flat surface.

E is a spool fitting onto the magnet-core $d$, and is wound with insulated copper wire F, and the wire is protected from external injury by an outside metallic sheath G, which incloses it.

H and H' are two trip-dogs which are rigidly secured to the shaft A. Each one of them is arranged to engage with a projection $l$ on the lower side of the tubes I I', which slide in the guides $m \, n$ and $m' \, n'$, attached to the truck-frame B B'. The tubes I and I' are telescoped by the rods J and J', respectively, which slide with some friction inside of them.

L is a cross-bar secured to the forward ends of the rods J J'. The tubes I I', rods J J', and the cross-bar L together constitute a yielding and extensible fender which is normally extended forward to a considerable distance ahead of the car, but which admits of being easily pushed backward by reason of the rods J J' sliding into the tubes I I' and of the tubes I I' in turn sliding in their guides $m \, n$ and $m' \, n'$.

M is another trip-dog attached rigidly to the shaft A and arranged to engage with a projection $o$ on the lower side of the rod N, which is arranged to slide through a guide $s$, attached to the truck-frame.

P is a two-armed lever pivoted to the car-body at $r$. One arm of the lever P is connected by pivot to the rod N and the other end to the rod R, having a pedal Q at its upper end.

The normal position of the levers $a$ $a'$ is as shown in Fig. 10, with the center of the pin $c$ above the center of the shaft A and a little forward of the vertical line passing through the center of the shaft A. In this position it is maintained by resting against the stop-pin K, where it is held by the weight of the brake-shoe acting on the lever $a$ through the link $b$ and the pin $c$. The nearer the stop-pin K is placed to the point where the lever $a$ is held vertical by it the less is the force required to push the lever off from it and tilt it to the other side of the vertical position, and the best position for the pin is that where the lever $a$ is held very slightly ahead of the vertical position.

It will be seen that the lever $a$ is normally in a condition of stable equilibrium resting against the stop-pin K, but if some force is applied to the shaft A to turn it and bring the lever $a$ vertical it is then in a position of unstable equilibrium and a very slight force will then tilt the lever over to the other side of the vertical and let the brake-shoe down onto the track. When the brake-shoe drops onto the track, the stem of the pop-valve $f$ in the sand-box is pushed upward, allowing the escape of some of the sand onto the rail, by which the friction of the shoe on the rail is greatly increased.

The turning of the shaft A back through the critical point where the lever $a$ tilts over and lets the brake-shoe down, as above described, is accomplished in either one of three ways: first, by the force of a person's foot applied to the pedal Q, or, second, by the force of a person or obstacle coming against the fender, or, third, by the force of a person or obstacle coming against the brake-shoe itself.

In the first case the force is transmitted to the shaft A through the rod R, lever P, rod N, and trip-dog M, the upper end of which is pushed backward by the projection $o$ on the rod N.

In the second case above mentioned the force is transmitted to the shaft through the rods J J', tubes I I', and trip-dogs H H', the upper ends of which are pushed backward by the projection $l$ on the tubes H H'. The friction of the rods J J' in the tubes I I' is great enough to transmit the small force that is required.

In the third case above mentioned the force coming directly on the brake-shoe swings it backward, and the force transmitted through link $b$ and pin $c$ to the lever $a$ pulls it backward through the critical tilting position and lets the brake-shoe down onto the rail.

Whenever the shaft A is turned back and the lever $a$ tilted back past the vertical position in any of the three ways above described, the metal segment $v$ is by that movement of the shaft brought into contact with the two springs $t$ $u$, thereby closing the electrical circuit through the electromagnets in the two brake-shoes and causing their pole-plates to draw firmly onto the rail, and the friction of the brake-shoe on the rail is thereby greatly increased.

The complete electrical circuit above mentioned is indicated in Fig. 2, where X is a battery, one terminal of which is connected to one terminal T' of one of the electromagnets, and the other terminal of the battery is connected to one terminal U of the other electromagnet, and the remaining two electromagnet-terminals T and U' connect with each other to complete the circuit, as above described, through the contact of the metal segment $v$ with the metal springs $t$ and $u$, which are mounted on an insulating-block W, attached to the truck-frame.

The battery at X may be used to represent any source of electric currents. It may be a storage battery used to propel the car, or it may be a trolley-circuit, or it may be a special battery used only to operate the brake. Any one of these may be placed in connection with the device shown and secure the desired result.

When the brake-shoe is brought down onto the track as the car is moving forward, the friction of the brake-shoe on the rails causes it to wedge itself under the car-wheels and bring all the weight that is on those wheels directly onto the brake-shoe. The friction thus caused by the weight of the car, together with the force of the magnets increased by the action of the sand discharged onto the rail from the sand-box, makes it possible to stop a car quicker than can be done with any brake previously devised, and it is feasible to construct the fender so as to extend beyond the wheels to a distance within which the car may be stopped by the brake described herewith.

When the fender strikes a person or obstacle on the track, its first action is to push the trip-dog back, thereby tilting the levers $a$ $a'$, and set the brake-shoes as before described; and it requires but a few inches of the movement of the fender to accomplish this, and then it slides back under the car as far as the obstruction may push it.

The force required to push the fender back being very small a person who may be struck by it is not liable to injury thereby, and as the car can, by means of the above-described brake, be brought to a standstill within the space reached over by the fender, it will be seen that my present invention removes the danger that has hitherto threatened pedestrians in city streets.

I am aware that many emergency-brakes have been invented prior to this application and that some of them have been connected with a fender which when struck by a person or obstacle would cause the brake to be brought into action; but such devices have failed by reason of not securing sufficient friction in time of emergency, and many of the fenders used are liable to seriously injure the person struck by them.

It is well known that a brake applied to the wheels of a car in the ordinary manner is liable to be set so tightly as to cause the wheels to skid along the track; and it is also well known that under those circumstances the brakes are very ineffective, and a car often slides a long distance before being brought to a standstill, and a fender could not be extended so far and the required protection of life is not secured.

I do not claim, broadly, the connection of a fender with a brake by which the latter is brought into action when the former strikes an obstruction; but What I do claim as new, and desire to secure by Letters Patent of the United States, is—

1. On a railway-car a brake-shoe composed of an electromagnet, one pole-piece of which has a flat surface adapted to slide on the rail and the other pole-piece of which has a curved surface conforming to the car-wheel; said shoe being thereby adapted to draw itself firmly against the wheel and against the rail and increase the friction, and means for holding said brake-shoe normally clear of the rail.

2. On a railway-car a brake-shoe composed of an electromagnet one pole-piece of which has a flat surface adapted to slide on the rail and the other pole-piece of which has a curved surface conforming to the car-wheel, a sand-box inclosed in one of said pole-pieces and means for holding said brake-shoe normally clear of the rail.

3. On a railway-car the combination of a brake-shoe composed in part of an electromagnet and having a flat surface adapted to slide on the rail and a curved surface conforming to the car-wheel, a fender arranged to yield readily on striking an obstacle, an electric switch in circuit with said electromagnet and means whereby the yielding movement of the fender drops the brake-shoe onto the rail and simultaneously operates the switch to close the circuit of said electromagnet.

4. On a railway-car, the combination of a brake-shoe having a curved surface conforming to the car-wheel and a flat surface adapted to slide on the rail, a sand-box contained in said brake-shoe, a fender arranged to yield readily on striking an obstacle, and means whereby the yielding movement of the fender brings the brake-shoe into active position on the rail and against the car-wheel.

5. On a railway-car, the combination of a brake-shoe having a curved surface conforming to the car-wheel and a flat surface adapted to slide on the rail, an electromagnet attached to said brake-shoe and adapted to draw it firmly onto the rail, a fender arranged to yield readily on striking an obstacle, and means whereby the yielding movement of the fender brings the brake-shoe into active position on the rail and against the car-wheel.

6. On a railway-car, the combination of a yielding fender, a brake-shoe having a curved surface conforming to the car-wheel and a flat surface adapted to slide on the rail, a lever-arm supporting said brake-shoe normally clear of the rail, and means for tilting the said lever-arm by the yielding movement of the said fender thereby bringing the brake-shoe into contact with the rail, and means substantially as described for increasing the friction of the shoe on the rail.

7. On a railway-car, a brake-shoe arranged to come in contact with the rail and with the car-wheel, a yielding fender operatively connected with said brake-shoe, a sand-box contained in said brake-shoe an electromagnet attached to said brake-shoe, and an electric-circuit-closing device operatively connected with said fender.

CHARLES C. PECK.

Witnesses:
T. J. O'NEILL,
E. BARLOW.